G. A. ROBINSON.
LIQUID MEASURING DEVICE.
APPLICATION FILED MAY 19, 1910.
991,802.
Patented May 9, 1911.
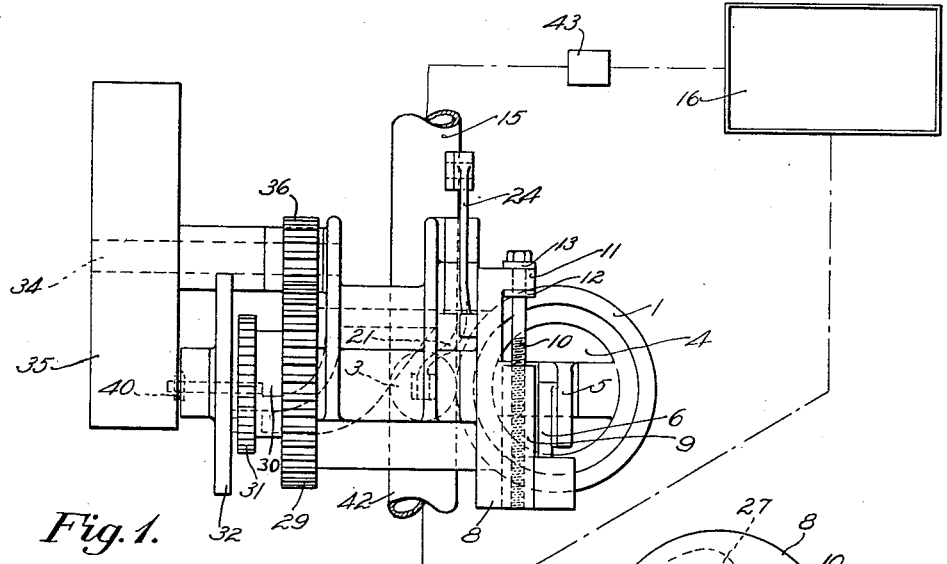
Fig. 1.
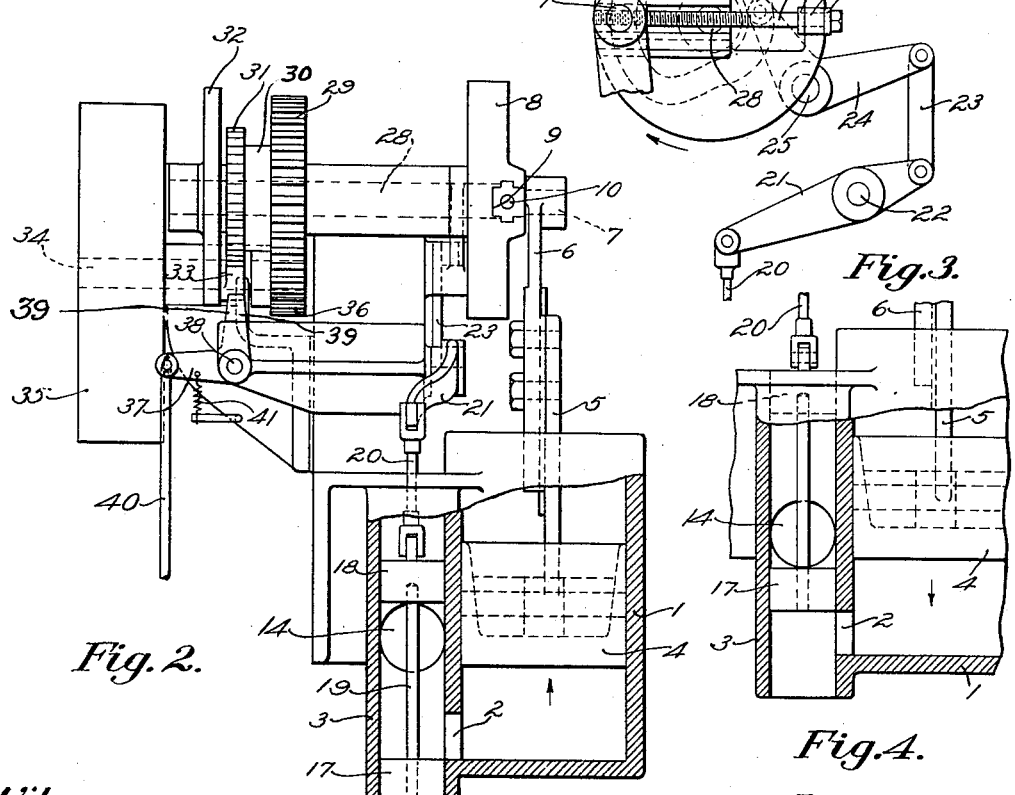
Fig. 2.
Fig. 3.
Fig. 4.
Witnesses:
R. Wallace.
John H. Parker.
Inventor:
George A. Robinson
by Macleod, Calver, Copeland & Dike
Attorneys

UNITED STATES PATENT OFFICE.

GEORGE A. ROBINSON, OF BOSTON, MASSACHUSETTS, ASSIGNOR TO PNEUMATIC SCALE CORPORATION LIMITED, OF QUINCY, MASSACHUSETTS, A CORPORATION OF MAINE.

LIQUID-MEASURING DEVICE.

991,802.　　　　　Specification of Letters Patent.　　Patented May 9, 1911.

Application filed May 19, 1910.　Serial No. 562,199.

*To all whom it may concern:*

Be it known that I, GEORGE A. ROBINSON, a citizen of the United States, residing at Boston, in the county of Suffolk and State of Massachusetts, have invented a certain new and useful Improvement in Liquid-Measuring Devices, of which the following is a specification, reference being had therein to the accompanying drawings.

The invention relates to an improvement in measuring devices for liquids or semi-liquids which are to be put up in cans or other receptacles for the market. Some kinds of liquids or semi-liquids are sold by measure and others are sold by weight, such for instance as lard and other semi-liquids which are in a liquid state when hot, which solidify when cool. In such cases the material is desired to be put up by weight. The measuring device of the present invention is adapted to be used in connection with a weighing machine, such for instance as a weighing and package filling machine of the type in which the material is supplied to the package from two or more positions, in the first position the package being given what is commonly termed the main load—that is, an amount approximately equal to the ultimate weight, and then the package or receptacle is transferred to a scale where the receptacle receives the balance of its load in a fine or drip stream. The apparatus of the present invention is adapted to be used with a machine of that character as a means for giving the so termed preliminary or main load, but if the material is sold by measure, the device is adapted to furnish the complete measured load.

The invention will be fully understood from the following description taken in connection with the accompanying drawings, and the novel features are pointed out and clearly defined in the claims at the close of the specification.

In the drawings,—Figure 1 is a plan of a machine embodying the invention. Fig. 2 is a side elevation, partly in section. Fig. 3 is a front elevation of the crank-plate which also serves as a cam, showing the cam-groove in the back of the crank-plate and the connections for operating the valve. Fig. 4 shows the piston and valves in position for discharging the contents of the measuring cylinder.

Referring to the drawings,—1 is a measuring cylinder having in one side near its bottom a passage 2 leading into a valve cylinder 3. Slidably fitted into the measuring cylinder 1 is a piston 4 provided with a rod 5 which is adjustably connected with a rod 6. Said rod 6 has a connection with a crank-pin 7, and said crank-pin 7 is connected with a crank-plate 8, the connection between the crank-pin 7 and the crank-plate 8 being by any suitable means. The means shown consists of a block 9 which is integral with or fast to the pin 7 and has a tongue and groove connection with the crank-plate 8 in such manner as to be adjustable toward and from the center of the crank so as to vary the length of stroke. This adjustment is shown in Fig. 3 and is as follows: An adjusting screw 10 is threaded into the block 9 at one end, the other end of the adjusting screw passing through a lug 11 which is integral with or fast to the crank-plate 8. The screw 10 is unthreaded in that portion which passes through the lug 11, and is held against longitudinal movement in the said lug 11 when the screw is turned by means of collars 12 and 13 at either end of the lug 11, so that by turning the screw the block 9 will be moved toward or from the center of the crank-plate.

In the side of the valve-cylinder 3, at some distance above the port 2 which connects with the measuring cylinder 1, is a passage 14 leading through a pipe or tubular connection 15 to the source of supply 16, said source of supply being any suitable reservoir. Slidably fitting in said valve-cylinder 3 is a piston-valve consisting of two pistons 17, 18, spaced at some distance apart and connected by a rod 19 so that they will move in unison with each other. These two pistons 17, 18, are spaced a sufficient distance apart so that when the lowermost piston 17 is just below the port 2 between the valve-cylinder and the measuring cylinder, the upper piston 18 will be above the passage 14 leading from the source of supply for reasons which will be hereinafter explained. Mechanism is provided for reciprocating said piston-valve vertically, the lowermost position of the valve being shown in Fig. 2 in which the lower piston 17 is just below the port 2 so as to leave a free passage between the valve-cylinder and the measuring cylinder. In the uppermost position of the piston-valve, as shown in Fig.

4, the bottom of the piston 17 will be just above the top of the port 2 without closing the passage 14 to the source of supply; thus, the passage between the source of supply and the valve-cylinder is always open for a reason which will be explained.

The means for operating the piston-valve is as follows: Pivotally connected with the upper piston 18 of the valve is a rod 20 whose upper end is pivotally connected with a lever 21 fulcrumed at 22, the short arm of said lever 21 being pivotally connected by a link 23 with the bell-crank lever 24 fulcrumed at 25. The other arm of said bell-crank 24, opposite the one which is connected with the link 23, is provided with a roll 26 which engages with a cam-groove 27 in the back face of the crank-plate 8 and which is so formed that at each rotation of the crank-plate 8, the valve-rod 20, and consequently the valve, will make a full stroke. Means are provided, however, so that the crank-plate 8 will stop at the end of each complete rotation, and the stopping point will be such that the piston 4 will be left in the half raised position shown in Fig. 2 and the piston-valve 17, 18 will be also left in the position shown in Fig. 2 for reasons which will be hereinafter explained.

The means for driving the crank-plate 8 so as to give it a single rotation and then stop is as follows: The crank-plate 8 is mounted on a shaft 28 on which is loosely mounted a gear 29. Fast to the hub 30 of said gear 29 is a ratchet 31. Mounted fast on said shaft 28 is a pawl-carrier disk 32 to which is pivoted a pawl 33 which is adapted to engage with the ratchet 31, and when so engaged, the shaft 28 will revolve with the pawl-carrier 32. The main driving shaft 34 is driven by a pulley 35 and carries a pinion 36 which engages with the gear 29 so that gear 29 is continuously rotating and gives rotation to the shaft 28 only when the pawl 33 on the carrier 32 is engaged with the ratchet 31. A bell-crank 37, fulcrumed at 38, has one arm 39 formed as a pawl-stop which is normally in position to trip the pawl 33 at the end of each rotation of the pawl-carrier 32 and shaft 28 so that when thus tripped, the shaft 28 will stop. As soon as the pawl-stop 39 is released from the pawl, the pawl will be engaged with the ratchet by a spring, not shown, so that the shaft 28 will again begin to rotate. The bell-crank 37 is connected with a rod 40, shown broken away, but which may be connected with a foot-treadle which the operator may work by foot-power, or with a handle which he may work by hand to turn the bell-crank and release the pawl-stop at will. As soon as the pressure upon the rod 40 is released, the bell-crank 37 will be turned by a spring 41 to turn the bell-crank again into engaging position. In the form of construction shown, the rod 40 is pushed up to release the pawl-stop and moves down to bring the pawl-stop again into engaging position, but it is immaterial whether it is constructed to act in that way or whether means are provided so that the rod 40 will pull down to release the pawl-stop and vice versa.

As previously stated, the cam-groove in the crank-plate 8 and the connections are so adjusted that at the end of each rotation of the shaft 28, the parts will be left in the position shown in Fig. 2. In this position the passage from the source of supply to the measuring chamber is open through the passage 14, valve-chamber 3 and port 2, the outlet from the valve-chamber 3 being closed by the piston 17. Now, when the operator releases the pawl-stop 39 from the pawl 33 so that the shaft 28 begins to rotate, the piston 4 will immediately rise to the end of its upward stroke without at first moving the valve-piston 17, 18. The suction thereby exerted will draw the liquid into the measuring cylinder until the measuring chamber of the cylinder is filled. The form of the cam-groove 27 is such that the instant the piston 4 reaches the top of its stroke, the piston-valve 17, 18, will quickly be moved its full upward stroke, carrying the piston 17 above the port 2, as previously described and shown in Fig. 4, without rising far enough to close the passage 14. This leaves a free passage from the measuring chamber 1 through the port 2 down out through the lower end of the valve-chamber 3 below the piston 17. The form of the cam-groove 27 is such that there will then be a dwell of the valve in this uppermost position during the descent of the piston 4 which will force the liquid in the measuring chamber out of the discharge end of the valve-chamber 3 into any receptacle which may be placed beneath. Just before the piston 4 reaches the bottom of its stroke, the valve 17, 18, will be given a quick downward stroke so as to reach the bottom of its downward stroke just after the piston 4 has commenced its upward stroke, the end of the rotation of the crank-plate leaving the piston 4 in the half-upward position shown in Fig. 2 and leaving the valve 17, 18, at the bottom of its stroke, as previously described. Some of the materials to be measured, such as lard or other such materials which thicken quickly when they begin to cool, are usually measured and put up when they are in the hot liquid form, but as they thicken quickly, they tend to clog up the passages through which they pass. For this reason, there is a return pipe 42 which connects with the tubular passage 14 in the valve-chamber on the opposite side from the inlet pipe 15 back to the reservoir 16 so as to always maintain a circulation and carry the surplus back to the reservoir to be again heated, and this is the reason that the passage 14 is always kept open by having the piston 18 always above the opening to the passage 14 and the piston 17 always below said opening. A pump 43 may be provided to assist in carrying the liquid back to the reservoir.

The piston 17, in completing its downward stroke to the bottom of the valve-cylinder 3, where it is left at the end of each period of movement, passes to the lower end of the valve-cylinder and thus completely expels from the valve-chamber all of the liquid or semi-liquid which may have gathered in the chamber of the cylinder, and also in this position it prevents leakage out of the lower end out of the cylinder.

What I claim is:

1. In a machine for filling receptacles with a predetermined quantity of liquid or semi-liquid material, a measuring cylinder, a valve cylinder having a passage therefrom into the measuring cylinder, said valve cylinder also having an outlet passage, a reservoir for the material having an inlet connection with the said valve cylinder and a return tubular connection from the valve cylinder to the reservoir, a valve movable within said valve cylinder which at some times in its movement closes the outlet from the valve cylinder and leaves open the inlet from the valve cylinder to the measuring cylinder and at certain other periods opens the connection between the measuring cylinder and the outlet from the valve cylinder and closes the passage from the reservoir through the valve cylinder to the measuring cylinder, the passage from the reservoir to the valve cylinder and from the valve cylinder back to the reservoir being always open for free circulation.

2. In a machine for filling receptacles with liquid or semi-liquid material, a reservoir, a measuring chamber, a valve chamber having a passage therefrom to the measuring chamber, and having also a discharge outlet, a conduit for the material from the reservoir to the valve chamber and a separate conduit from the valve chamber back to the reservoir, both of said conduits being always open both to the reservoir and to the valve chamber for free circulation, a movable valve which at some times in its movement closes the discharge outlet from the valve chamber and leaves open the inlet from the valve chamber to the measuring chamber and at certain other periods opens the connection between the measuring chamber and the discharge outlet from the valve chamber and closes the passage from the reservoir through the valve chamber to the measuring chamber.

3. In a machine for filling receptacles with liquid or semi-liquid material, a reservoir, a measuring chamber, a valve chamber having a passage therefrom to the measuring chamber, a discharge outlet, a conduit for the material from the reservoir to the valve chamber and a separate conduit from the valve chamber back to the reservoir, both of said conduits being always open both to the reservoir and to the valve chamber for free circulation, and a movable valve which controls the passage of the material from the valve chamber to the measuring chamber and thence from the measuring chamber through the discharge outlet.

4. In a machine for filling receptacles with a predetermined quantity of liquid or semi-liquid material, a measuring-cylinder, a valve-cylinder having a passage therefrom into the measuring-cylinder, said valve-cylinder having an outlet passage, a reservoir for the material having a tubular inlet connection with the said valve-cylinder above the passage from the valve-cylinder into the measuring-cylinder, and a return tubular connection from the valve-cylinder to the reservoir, a piston-valve having two pistons connected with each other and movable within said valve-cylinder, one of said pistons being at all times above the inlet from the reservoir to the valve-cylinder and the return tube from the valve-cylinder to the reservoir and the other of said pistons being at all times below said inlet and return tube, said piston-valve being movable with sufficient length of stroke whereby at certain times in its movement it closes the outlet from the valve-cylinder, leaving open the inlet passage from the reservoir to the valve-cylinder and thence to the measuring-cylinder and at certain other periods it rises above the opening between the valve-cylinder and the measuring-cylinder, thereby leaving a free passage from the measuring-cylinder through the valve-cylinder outlet.

5. In a machine for filling receptacles with a predetermined quantity of liquid or semi-liquid material, a measuring-cylinder, a valve-cylinder having a passage therefrom into the measuring-cylinder, said valve-cylinder having an outlet passage, a reservoir for the material having a tubular inlet connection with the said valve-cylinder above the passage from the valve-cylinder into the measuring-cylinder, and a return tubular connection from the valve-cylinder to the reservoir, a piston-valve having two pistons connected with each other and movable within said valve-cylinder, one of said pistons being at all times above the inlet from the reservoir to the valve-cylinder and the return tube from the valve-cylinder to the reservoir and the other of said pistons being at all times below said inlet and return tube, said piston-valve being movable with sufficient length of stroke whereby at certain times in its movement it closes the outlet from the valve-cylinder, leaving open the inlet passage from the reservoir to the valve-cylinder and thence to the measuring-cylinder and at certain other periods it rises above the opening between the valve-cylinder and the measuring-cylinder, thereby leaving a free passage from the measuring-cylinder through the valve-cylinder outlet, and a pump to force the return circulation to the reservoir.

In testimony whereof I affix my signature, in presence of two witneses.

GEORGE A. ROBINSON.

Witnesses:
WILLIAM A. COPELAND,
ALICE H. MORRISON.